US007613949B1

(12) United States Patent
Boone et al.

(10) Patent No.: US 7,613,949 B1
(45) Date of Patent: Nov. 3, 2009

(54) FAULT ISOLATION SYSTEM AND METHOD

(76) Inventors: Lewis A. Boone, 5413 W. Brenner Pass, Fridley, MN (US) 55432; Thomas J. Menart, 2965 Country Dr., Apt. 109, St. Paul, MN (US) 55117; John A. Miller, 4395 Cumberland Ct., Shoreview, MN (US) 55126; Brett W. Tucker, 14045 45th St. N., Stillwater, MN (US) 55082

( * ) Notice: Subject to any disclaimer, the term of this patent is extended or adjusted under 35 U.S.C. 154(b) by 371 days.

(21) Appl. No.: 11/490,601

(22) Filed: Jul. 21, 2006

Related U.S. Application Data

(60) Provisional application No. 60/818,161, filed on Jun. 30, 2006.

(51) Int. Cl.
*G06F 11/00* (2006.01)
(52) U.S. Cl. .............................. 714/25; 714/40; 714/42; 714/43; 714/44; 714/48
(58) Field of Classification Search .................. 714/25, 714/26
See application file for complete search history.

(56) References Cited

U.S. PATENT DOCUMENTS

| 5,200,958 | A * | 4/1993 | Hamilton et al. .............. 714/45 |
| 6,385,665 | B1 * | 5/2002 | Canady et al. ................. 710/2 |
| 7,076,688 | B2 * | 7/2006 | Yamamoto ..................... 714/6 |
| 7,434,099 | B2 * | 10/2008 | Flynn et al. .................... 714/26 |
| 2003/0149919 | A1 * | 8/2003 | Greenwald et al. ............. 714/43 |
| 2003/0221140 | A1 * | 11/2003 | Bakke et al. ................... 714/25 |
| 2004/0078683 | A1 * | 4/2004 | Buia et al. ..................... 714/37 |
| 2004/0078695 | A1 * | 4/2004 | Bowers et al. ................. 714/39 |
| 2005/0060619 | A1 * | 3/2005 | Liberty et al. ................. 714/55 |
| 2005/0102567 | A1 * | 5/2005 | McGuire et al. ............... 714/25 |
| 2005/0144505 | A1 * | 6/2005 | Takeuchi et al. ................ 714/4 |
| 2006/0161819 | A1 * | 7/2006 | Nissan-Messing et al. ..... 714/48 |
| 2007/0074076 | A1 * | 3/2007 | Imai et al. ..................... 714/26 |

OTHER PUBLICATIONS

Microsoft, Microsoft Computer Dictionary, 2002, Microsoft Press, 5th Edition, p. 311.*

* cited by examiner

*Primary Examiner*—Scott T Baderman
*Assistant Examiner*—Chae Ko

(57) ABSTRACT

A mechanism for isolating failures in a digital system is provided. In one embodiment, a fault table is defined for each unit in the system. Related faults are ordered within the table to reflect the time-order in which the faults would be activated during operation of the associated unit. When multiple related faults are reported for a given unit in the system, the fault that is first located when a linear search of the corresponding fault table is conducted is considered the source of the failure within the unit. If faults are reported for multiple units, the source of the failure for the system is identified using at least one of primary and second priority values assigned to the faults, timestamps obtained when the faults are reported, and an order in which the faults are logged.

17 Claims, 8 Drawing Sheets

| FAULT TYPE | PRIMARY PRIORITY | SECONDARY PRIORITY |
|---|---|---|
| 002-000-000 | 0 | 4 |
| 002-001-000 | 1 | 2 |
| 002-002-000 | 0 | 3 |
| 002-003-000 | 3 | 6 |
| ⋮ | ⋮ | ⋮ |
| 002-00N-000 | 0 | 1 |
| ⋮ | ⋮ | ⋮ |
| 002-003-OFF | 0 | 4 |
| 002-001-OFF | 0 | 2 |
| 002-004-OFF | 0 | 3 |
| ⋮ | ⋮ | ⋮ |

UNIT 2 FAULT TABLE

*Figure 2A*

| FAULT TYPE | PRIMARY PRIORITY | SECONDARY PRIORITY | STATE DESCRIPTION DATA | DECISIONAL LOGIC |
|---|---|---|---|---|
| 00M-000-000 | 0 | 1 | | |
| 00M-001-000 | 0 | 1 | | |
| ⋮ | ⋮ | ⋮ | | |
| 00M-00N-FFF | 0 | 1 | | |

UNIT M FAULT TABLE

*Figure 2B*

| FAULT TYPE | TIME STAMP |
|---|---|
| 002-003-000 | 00005000000 |
| 002-001-000 | 00005000000 |
| 00M-000-000 | 00005000010 |
| 002-00N-000 | 00005000000 |
| 002-002-000 | 00005000000 |
| 00M-001-000 | 00005000012 |

FAULT LOG

*Figure 2C*

| FAULT TYPE | MAINTENANCE ACTION | NOTIFICATION INFORMATION | TEMPORARY ACTION |
|---|---|---|---|
| 000-000-000 | LOAD NEW MICROCODE | AUTO PHONE MESSAGE | RESTART SYSTEM |
| ⋮ | ⋮ | ⋮ | ⋮ |
| 002-000-000 | REPLACE UNIT 2 | AUTO EMAIL | ENABLE REDUNDANT UNIT 2 |
| ⋮ | ⋮ | ⋮ | ⋮ |
| FFF-FFF-FFF | REPLACE UNIT FFF | AUTO FAX | SYSTEM REMAINS STOPPED |

FAULT ACTION TABLE

*Figure 2D*

FAULT ISOLATION SYSTEM AND METHOD

CLAIM OF PRIORITY TO PARENT APPLICATION

This application claims priority to provisionally filed U.S. patent application Ser. No. 60/818,161 filed Jun. 30, 2006, which is incorporated herein by reference in its entirety.

FIELD OF THE INVENTION

The current invention relates to fault handling within a data processing system; and, more particularly, relates to a mechanism for isolating faults within this type of system.

BACKGROUND

Data processing systems are used in virtually all areas of modern society. The ever-increasing dependence on such systems is leading to demands for increased system availability and lower mean time to repair. Therefore, improved techniques for the detection and isolation of faults are essential.

Various techniques for both fault detection and fault isolation are well known in the art. The earliest of these techniques employed diagnostic test software to assure the operability of the computer system before running an application program. More recently it has become the practice to augment such software with built-in hardware fault detection circuitry such that a fault can be detected when it occurs, even while the computer is running an application program.

A further improvement to the foregoing involves the addition of fault indicators on each of the replaceable subassemblies such as the printed circuit cards. Now when a fault occurs, the corresponding indicator is activated. In theory, a technician may address the situation simply by replacing the unit associated with the activated fault indicator.

The use of fault indicators alone does not solve all problems however. This is because when a fault occurs in a data processing system, the fault will likely propagate to other areas of the system. As a result, other faults indicators will be activated. This type of ripple effect may result in a large number of fault reports. Some type of analysis is needed to determine which fault is the source of the problem.

One way to address this situation is to use a timestamp method to aid in the foregoing analysis. According to this process, when a fault is detected, the contents of an associated counter/timer are recorded. Assuming all counters within the system are synchronized, the timer records can be used as timestamps that determine the chronological order of the faults. The first-occurring fault can thereby be identified as the likely source of all subsequently-reported problems.

This prior art approach has several limitations. First, multiple faults may be occurring within a short period of time. If timestamps are not captured at a high enough frequency, multiple faults may have the same timestamp. Moreover, some faults, such as clock and power faults, cannot readily be associated with accurate timestamps. Therefore, either no time indications will be present when these types of faults occur, or the timestamps that are available are likely inaccurate. Thus, an improved mechanism is needed to isolate the likely cause of multiple related failures.

SUMMARY OF THE INVENTION

The current invention provides an automated multi-step mechanism for isolating faults occurring within digital systems such as data processing systems. According to one embodiment, the system is sub-divided into multiple sections of logic referred to as "units". A unit is any group of logic that cooperates to perform one or more functions within the system. A unit may be defined to contain as much or as little logic as desired.

Next, a fault table is defined for each unit, with the table providing an entry for each possible fault type that may occur within that unit. Faults that are related, and that may arise during processing of a same function, are grouped into the same fault sequence. The faults in the same fault sequence are ordered within the fault table in a manner that corresponds to the processing flow that occurs during execution of the function. In other words, the faults appear in the fault table in the order they would be activated by an error propagating through the logic during function execution.

The fault tables are used to isolate failures within a system that is being monitored as follows. In one embodiment, when a failure occurs, one or more faults are reported to a maintenance processor that is monitoring the system. The maintenance processor waits a predetermined period of time so that all related fault reports have been received. Each of these fault reports includes a unique fault type that identifies the unit, as well as a block of logic within that unit, that is associated with the fault. The fault type also uniquely identifies the type of error that occurred. As noted above, generally multiple related fault reports will be received when a failure occurs because of error propagation.

After the delay period elapses, the maintenance processor begins fault analysis by grouping all faults types that were received for the same unit. For each unit that is associated with a group of one or more reported faults, a linear search is then performed of the corresponding fault table to locate the one of the reported faults for that unit that appears within the table first. Because of the ordering of related faults within each fault table, this "first-occurring", or "first-appearing", fault is likely the source of the failure for that unit.

If all fault reports are associated with a single unit in the system, the identified source of the failure for that unit is the source of the failure for the entire system. However, if the reported faults occurred within more than one unit, more analysis is needed. In this case, a first-occurring fault is identified for each of the units for which at least one fault was reported. Then a primary priority value that has been pre-assigned to each fault type is used to determine which fault is likely the source of the failure. In one embodiment, the fault type associated with the highest primary priority value is considered the likely source of the failure.

According to another aspect of the invention, if two reported faults have the same highest primary priority value (that is, a "tie" occurred between the first-occurring faults for two or more units), and if a timestamp was captured with the "tied" faults, the timestamp is used to determine the source of the failure. In particular, the fault associated with the earliest timestamp is considered the source of the failure. If two timestamps are the same (that is, another "tie" occurred), a secondary priority field value is used to break the tie. Finally, if the secondary priority field values are the same for two or more of the faults, the fault that was first logged by the maintenance processor is considered the source of the failure.

After the fault that is the source of the failure is identified, a fault action entry associated with the fault is obtained. This fault action entry may provide at least one of a long-term maintenance action to be taken to address the fault (e.g., replace a failing device), a short-term action to be taken to temporarily work around the fault (e.g., temporarily enable a redundant device until the replacement device becomes available), and a notification action to take to notify appropriate parties of the problem (e.g., notify a support engineer of the fault and the maintenance actions to take to address the fault.) Preferably, at least some of these actions are initiated automatically by the maintenance processor.

In one embodiment, for a given fault, any one of multiple fault actions may be taken. In this case, the fault action that will be taken for a given fault is selected based on state information that may be retrieved by the maintenance processor from the system. In particular, a scan interface of a type known in the art can be used by the maintenance processor to retrieve the state of one or more predetermined state devices within the system. The retrieved state may be used in conjunction with logic constructs (e.g., Boolean logic constructs) to select the fault action to be taken for whichever fault has been determined to be the source of the failure.

According to one embodiment of the invention described herein, a computer-implemented method of isolating failures in a system is provided. The method includes receiving multiple reports of faults occurring within a unit, and performing a linear search of a fault table to identify one of the multiple faults that first appears in the fault table. This first-appearing, or "first-occurring", fault is determined to be the source of a failure within the unit.

Another embodiment of the invention provides a system to isolate failures within a monitored system. The system includes a storage device to store one or more fault tables, and a processor to receive faults reports. Each fault report identifies a fault occurring within the monitored system. The processor determines which of the faults are associated with a same unit of the monitored system, and then performs a linear search of one of the fault tables that is associated with the unit. This search determines which of the associated faults is encountered first within the one of the fault tables. This first-encountered (i.e., first-occurring) fault is identified as the source of a failure within the unit of the monitored system.

Still another aspect of the invention relates to a fault isolation system for isolating a failure in a monitored system. The system includes means for logging faults detected within the monitored system. The system also includes means for grouping the faults based on which units of the monitored system detected the fault and for thereafter searching a fault table to determine which fault in a group of faults appears first in the table. The first-appearing fault is then considered the source of the fault for a unit associated with the group.

Other scopes and aspects of the invention will become apparent to those skilled in the art from the following description and the accompanying drawings.

BRIEF DESCRIPTION OF THE DRAWINGS

FIG. 2A is an exemplary fault table that may be used to diagnose a fault occurring in the system of FIG. 1.

FIG. 2B is another exemplary fault table that may be used to diagnose a fault occurring in the system of FIG. 1.

FIG. 2C is an exemplary fault log that is maintained by a maintenance processor according to one embodiment of the invention.

FIG. 2D is a fault action table that lists the actions that are to be taken for each type of fault.

DETAILED DESCRIPTION OF THE DRAWINGS

Figure 1:
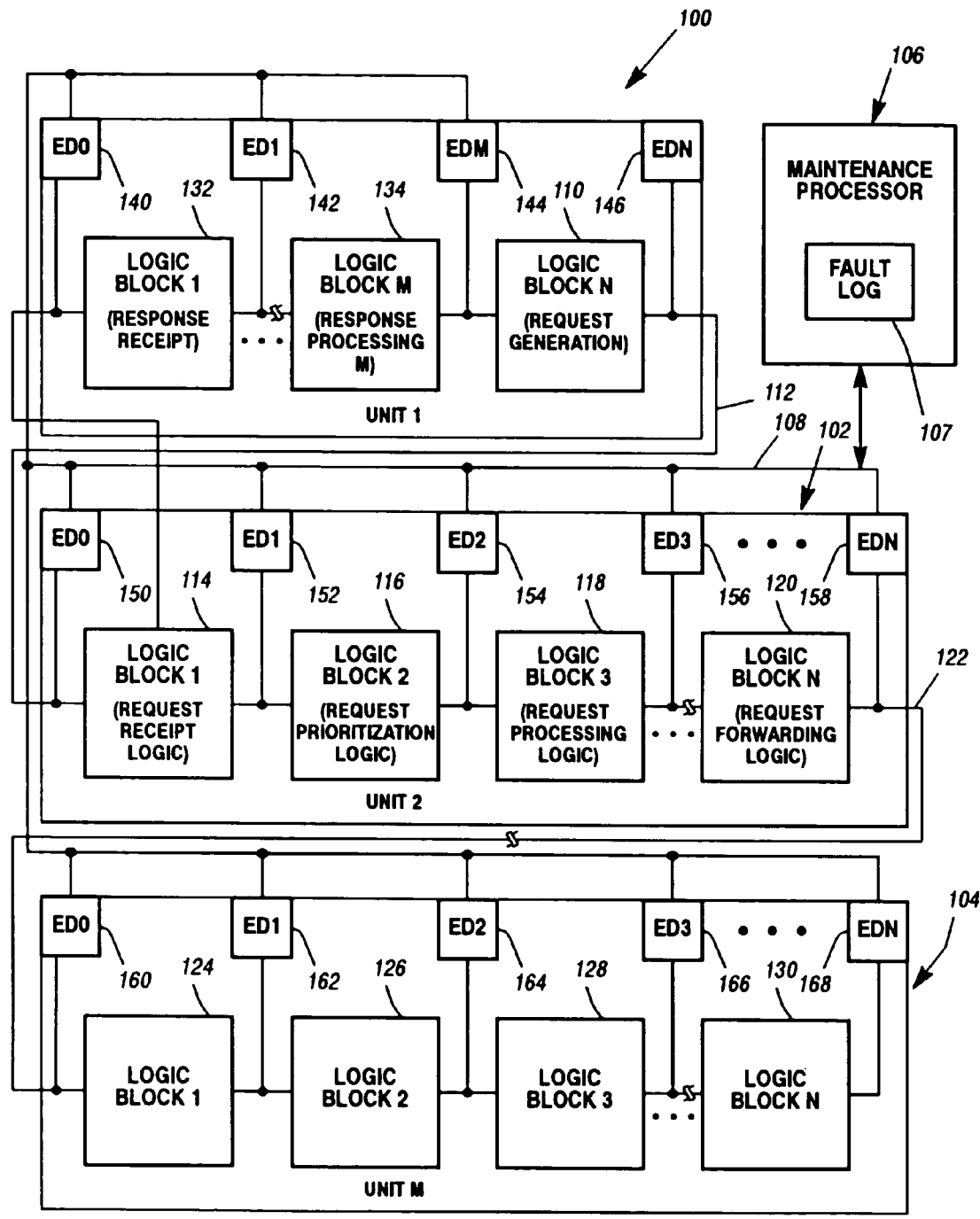
FIG. 1 is a logic block diagram of a system that may be adapted for use with the current invention.

FIG. 1 is a logic block diagram of a system that may be adapted for use with the current invention. This invention relates to a mechanism for isolating faults in a data processing system.

The problems associated with fault isolation, as well as the mechanism of the current invention, can best be understood by considering an exemplary system of FIG. 1. This logic block diagram includes unit 1 100, unit 2 102, up to unit M 104.

For purposes of the current invention, the term "unit" is defined as any user-defined logic group that cooperates to perform one or more functions within the system. A unit may be a processor, a cache, a main memory, an I/O device, and so on. A unit may also be defined as a predetermined sub-set of one of these devices, such as the ALU logic of the processor. A unit may be defined to include one or more circuit-cards or one or more silicon devices. Conversely, a unit may be a subset of logic within a single silicon device or on a single circuit card. Thus, the term "unit" may encompass virtually any division of cooperating logic within the system that the user so chooses, and any number of units may be included within the system.

In addition to units 100-104, FIG. 1 also includes a maintenance processor 106. This maintenance processor 106 is coupled to the other units in the system via scan interface 108. As is known in the art, interface 108 is of a type that allows maintenance processor to initialize the various state devices within units 100-104 at system initialization time. This scan-set interface also allows for the reporting of errors, and provides a mechanism whereby the state of one or more units may be read for diagnostic purposes. The maintenance processor 106 may also use the interface to initiate recovery actions following the occurrence of a fault. The use of maintenance processor 106 and scan interface 108 in isolating faults is described further below.

As described above, each unit is merely a predetermined amount of logic that cooperates together to perform one or more functions. Each of the units may further be sub-divided into predefined groups of logic that will be referred to as "logic blocks". For instance, each of units 100-104 is shown to include logic blocks 1-N. Each logic block includes related circuitry that performs a function within the unit.

As an example of the foregoing, assume that unit 1 is an instruction processor and unit 2 is a cache. Logic block N 110 within unit 1 is adapted to generate requests for data to unit 2 over interface 112. These requests are received by logic block 1 114 of unit 2. The requests are passed to logic block 2 116 which may be request prioritization logic. After the requests are prioritized, requests are selected for processing by logic block 3 118. This may involve referencing cache tag logic to determine whether the requested data is stored in a cache memory.

If the addressed data is present in the cache, other logic blocks (not shown) may be provided for retrieving the data and returning the data to the requesting unit 1. If the addressed data is not present in the cache, logic block N 120 may be provided to forward the request to unit M 104 on interface 122. Unit M may be a main memory, and may include various logic blocks that are similar to those shown for unit 2. For instance, logic block 1 124 may be provided to receive the requests from interface 122. Logic block 2 126 may be adapted for prioritizing the requests. Logic blocks 3-N, 128-

130, may include various circuits for processing the requests, including retrieving requested data from memory and returning the data to unit 1 and/or unit 2.

Within unit 1 100, logic blocks 1 through logic blocks M, 132-134, respectively may be provided for receiving the returned data and for using this data to perform processing tasks in accordance with a programmed stream of instructions.

In FIG. 1, each of the logic blocks is shown to be associated with error detection (ED) logic. For instance, unit 1 includes ED0-EDN, 140-146, respectively. Similarly, unit 2 includes ED0-EDN, 150-158, respectively. Finally, unit N includes ED0-EDN, 160-168, respectively. Each ED logic section is adapted to detect errors that are associated with the signals sourced by the respective logic block or provided on a respective interface. For instance, ED0 150 of unit 2 detects errors that have occurred on the signals of interface 112. ED1 152 of unit 2 detects errors occurring on signals sourced by logic block 1 114 of unit 2, and so on.

Each of the ED logic sections may be capable of detecting multiple fault types. For instance, assume that address, data, and control signals are provided from logic block 1 114 to logic block 2 116 and each of these fields is parity protected. A parity error occurring on address signals may result in ED1 152 reporting a first type of error. A parity error on the data signals may result in ED1 reporting of a different error type, and so on. Moreover, ED1 152 may check for other types of faults, such as queue overflow errors that occur when more than a predetermined number of requests are being received in a certain time period.

If an error is detected by any of the error detection logic sections, a fault report is provided by that ED logic to maintenance processor 106 via scan interface 108. This fault report will include a fault type that uniquely identifies the error, the logic block with which the error is associated, and the unit containing that logic block. For instance, assume ED1 152 of unit 2 detects a data parity error on signals provided by logic block 1 114 to logic block 2 116. In response, ED1 152 will submit a fault report containing a fault type that uniquely identifies the data parity error occurring within logic block 1 114 of unit 2.

Many of the ED logic sections are associated with counter/timers (not shown in FIG. 1). These counter/timer circuits are synchronized with one another. When an ED logic section detects an error, the contents of the associated counter/timer circuit are captured for use as a timestamp that is included in the fault report. This timestamp is used by maintenance processor 106 to perform fault analysis, as will be described below.

As may be appreciated, the system of FIG. 1 is a generalization of a data processing system containing M units. Any number of units may be provided within the system. These units may be coupled via point-to-point interfaces, bused interfaces, networks, or any other type of interfaces known in the art. Similarly, the logic blocks shown in FIG. 1 are provided by way of illustration only. Many types of logic blocks other than those represented in this diagram may be included in one or more units of the system. Further, it may be appreciated that the circuitry within a given logic block may be as complex or as simple as desired. For instance, some logic blocks may include a single state device such as a register. Other logic blocks may be limited to one level of combinational logic. If desired, a logic block may include a large circuit that includes many levels of combinational logic, state devices, state machines, microprocessors, memory and/or other storage devices, and so on. The amount of logic included in each logic block will be determined by the granularity of fault detection that is desired within the system. This may, in turn, be determined by such considerations as the amount of logic that is available for dedication to fault detection, power consumption constraints, and so on. This may also be determined based on how faults will be handled. For instance, if all of the logic in unit 2 resides on a single device (e.g., silicon chip), and further if any hard (re-occurring) failure in that device will be handled merely by replacing the device, fault detection need not be as granular. However, if some types of corrective actions are available to temporarily or permanently "work-around", or even fix, detected faults, it may be desirable to detect those faults at a much higher granularity.

The foregoing discussion describes how a fault occurring within a logic block of a unit may be detected and reported by a corresponding error detection circuit. Oftentimes, however, the generating of a fault report is not, in itself, enough to pinpoint the source of the failure. This is because when a failure occurs, it often propagates to other logic blocks in one or more other units. For instance, an error occurring in logic block 1 114 of unit 2 may propagate through logic blocks 2-N of unit 2, and from there may further propagate to the logic blocks of unit M 104. The original fault may also result in the detection of errors within unit 1 100. As a result, a single fault may result in the generation of many fault reports.

Prior art systems utilize the timestamps included in the fault reports to determine which logic block is the likely source of the failure. In other words, the fault report containing the earliest timestamp is considered to be associated with the first-occurring fault, and therefore is used to determine the origin of the failure. However, if the contents of the counter/timers are not captured at a high enough frequency, many fault reports may contain the same timestamp. Another limitation involves the fact that some errors cannot be associated with an accurate timestamp. For instance, accurate timestamps can generally not be provided for errors associated with power supply or clocking faults.

When timestamps cannot be used to isolate a fault, detailed analysis requiring human intervention may be required to determine the source of the problem. Such analysis may involve interrupting the normal operations of the system. Maintenance processor 106 and scan interface 108 may then be employed to capture the state of the system. Not only does this disrupt on-going processing activities, but it requires the expertise of a trained technician.

The current invention addresses these limitations by providing an automated multi-step mechanism for more accurately isolating faults occurring within systems such as that shown in FIG. 1. According to one embodiment, for each unit of the data processing system, a fault table is defined. This fault table provides an entry for each possible fault that may occur within that unit. Related fault entries appear within the table in an order that corresponds to the processing flow of associated signals within the unit. In this manner, a linear (e.g., top-to-bottom) search of a fault table will first encounter the fault that is the likely source of a failure.

As an example of the foregoing, assume certain control signals are generated within logic block N 120 of unit 102. These signals are provided to logic block 2, 116, of unit 2 and from there flow to logic block 3, 118. Errors may occur on these signals at each step along the way. For example, assume that because of a failure in logic block N 120, EDN 158 detects a fault type "error_N" on these signals. Because the error propagates, ED2 likewise detects a fault type of "error_2" and ED3 detects a fault type of "error_3".

When a fault occurs, each of the ED logic sections EDN, ED2, and ED3 generates a fault report that includes the unique fault type and any available timestamp. These fault reports are provided to maintenance processor 106 via scan interface 108. Maintenance processor stores each fault report in fault log 107 in the order in which it was received.

Following receipt of the first fault report, the maintenance processor will wait for a particular trigger event before it begins to perform fault analysis. Processing is delayed in this manner so that all fault reports associated with a given failure are stored to fault log 107 before any of the fault reports is analyzed. In one embodiment, processing of the fault reports will be initiated after a predetermined time period elapses without receiving additional fault reports. In another embodiment, processing is initiated after a predetermined time period elapses from time of receipt of the first fault report. In one exemplary embodiment, processing of the fault reports is initiated five minutes after receipt of the first fault report, unless the system sooner stops because of the failure, at which time fault processing is initiated. Any other trigger event may be defined, so long as the trigger event ensures that all of the fault reports associated with the same failure have been received by the maintenance processor.

After the trigger event occurs, maintenance processor 106 begins analyzing the data contained in the fault log 107. When the fault log contains multiple fault reports for the same unit, as is the case in the current example, maintenance processor 106 conducts a linear search of that unit's fault table. Because of the manner in which the faults are ordered in the table, the reported fault that is encountered first during a linear search of the fault table is likely the source of the failure within the unit.

The foregoing may be illustrated by returning to the current example. According to the invention, the group of related faults will be ordered within the fault table to correspond to the flow of processing within the logic. As such, "error_N" appears in the fault table first, followed by "error_2", and then by "error_3".

Next, assume that maintenance processor conducts a linear (e.g., top to bottom) search of the fault table for unit 2. The maintenance processor is looking for the first-occurring one of "error_N", "error_2" and "error_3" since all three of these fault types have been located within fault log 107 for unit 2. During a linear search of the fault table, error_N will be located first, indicating that the failure likely originated in logic block N 120.

In the foregoing manner, the maintenance processor determines the "first-occurring fault" for a given unit. Another more complex example of the use of fault tables is provided in reference to FIGS. 2A-2C.

FIG. 2A is an exemplary fault table that may be used to diagnose a fault occurring in unit 2 of FIG. 1. This table includes a first column 200 that lists all fault types that may be reported for unit 2. In this example, each fault type is represented by a numeric designator. A second column 202 provides a corresponding primary priority value for each fault type appearing in column 200. Similarly, a third column 204 lists a secondary priority value for each fault type of column 200. The use of the primary and secondary priority values will be discussed further below.

As discussed above, each fault type listed in column 200 uniquely identifies an error type (e.g., data parity error, address parity error, etc.), a logic block that provided the signals on which the error was detected, and the unit that includes the logic block. In this example, the fault types designators of column 200 are in a format "XXX-YYY-ZZZ" wherein "XXX" identifies the unit, "YYY" identifies the logic block, and "ZZZ" identifies the error type. Thus, for instance, the entry appearing in the first row of the table includes the fault type "002-000-000" indicating the error occurred in unit 2, logic block 0, and is the error associated with code "000". In an embodiment such as that being currently described wherein each fault table is associated with a particular unit, the fault types may omit the unit identifier "XXX" if desired, as all fault types within a selected table will have the same unit identifier.

FIG. 2B is an exemplary fault table that may be used to diagnose a fault occurring in unit M of FIG. 1. Like the table of FIG. 2A, this table includes a first column that includes fault types for all possible faults that may occur in unit M. This table also lists the corresponding primary and secondary priorities for each fault type.

It may be noted that the fault table of FIG. 2B has two additional columns 205 and 207 as compared to the fault table of FIG. 2A. The use of these columns will be described further below in regards to determining which action(s) to take in response to a fault.

FIG. 2C is an exemplary fault log 107 that is maintained by maintenance processor 106. As discussed above, when maintenance processor receives a fault report from one of the units of FIG. 1, an entry is created in the fault log. The entry includes a fault type as shown listed in column 210 of the fault log. Any corresponding timestamp is added to column 212 of the same entry. For instance, entry 214 includes a fault type of "002-003-000" and a corresponding timestamp of "00005000000". For fault types that do not correspond to a valid timestamp, such as faults that are associated with power supply or clock problems, a predetermined "invalid" indicator may be contained in the timestamp field instead of the valid timestamp. This will be discussed further below.

In the table of FIG. 2C, the format of the fault types listed in column 210 of the fault log is the same as that used for the fault types in the fault tables of FIGS. 2A and 2B. In a different embodiment, this need not be the case. For instance, the fault types listed in a fault table may omit the unit identifier "XXX" since this identifier will be the same for all faults in that table, as previously described.

The fault log of FIG. 2C includes six entries, each in a different row of the table. Each entry corresponds to a different fault report. In one embodiment, entries are added to the fault log in the order in which the fault reports are received by maintenance processor 106.

The use of the fault tables and fault log of FIGS. 2A-2C may be best described by another example, as follows. Assume unit 1 is a processor making a read request for data to unit 2, which is a cache. After logic block N 110 of unit 1 submits the request on interface 112, ED0 150 determines that parity on the various fields of the request is correct. However, after logic block 1 114 handles the request, an address parity error is detected by ED1 152. This error, which is associated with fault type "002-001-000", is included in a fault report issued by ED1 to maintenance processor 106.

Next, assume that the address error is propagated to logic blocks 2-N of unit 2. This error is further propagated to unit M on interface 122. This results in ED2-EDN of unit 2 each generating additional fault reports. For purposes of this example, it will be assumed that each of the fault reports have fault types that include the error identifier "ZZZ" set to 000 which corresponds to an error type of address parity error. Thus, for instance, ED2 154 generates a fault report with a fault type of "002-002-000", ED3 156 generates a fault report that includes a fault type of "002-003-000", and so on. In a similar manner, ED0 160 and ED1 162 of unit M generate fault reports having fault types of "00M-000-000" and "00M-001-000", respectively.

The fault log of FIG. 2C includes an entry for each of the fault reports described above. Each entry is listed in a different row of the table. It will be assumed that the entries were added to the fault log in the order in which maintenance processor 106 received the fault reports. As can be seen by FIG. 2C, this order does not necessarily correspond to the order in which the error occurred or was detected by a particular logic block. For instance, the first entry 214 in row one of the fault log includes a fault detected by ED3 156 of unit 2. This is apparent since this entry includes a fault type having a unit identifier "XXX" of 002 and a logic block identifier "YYY" of 003. The next entry is the result of the fault report issued by ED1 152 of unit 2. A following entry is from ED0 160 of unit M, and so on.

It may be noted that the timestamps for many of the fault log entries are the same. For instance, the first two entries of the fault log have a timestamp of "00005000000". This may occur because of a relatively slow frequency used to increment the counter or to capture the timestamp. Alternatively or additionally, this may occur because all of the fault reports are generated within a relatively short period of time. This will be discussed further below.

According to the current invention, maintenance processor 106 uses the tables of FIGS. 2A and 2B to process the entries shown in the fault log of FIG. 2C. This occurs in a manner similar to that described above. That is, after the trigger event occurs, maintenance processor 106 uses the fault types to determine which fault tables will be involved in isolating the fault. In the current example, the unit identifiers "XXX" of the various fault types indicate that fault tables for units 2 and M will be involved in the fault processing.

After the fault tables have been identified, fault isolation occurs for each unit. For instance, fault processing for unit 2 is initiated by performing a linear search of the fault table of FIG. 2A. This search locates the first entry of the fault table having a fault type that matches a fault type within the fault log. Thus, in the current example, maintenance processor starts with the first row of the fault table to determine whether the fault type "002-000-000" is represented by any of the entries in the fault log. Since this fault type is not associated with a fault type represented in the fault log, maintenance processor progresses to the next row in the fault table, which includes a fault type of "002-001-000". This fault type is included in the second entry of the fault log. Therefore, that fault log entry corresponds to the first-occurring fault within unit 2. As was the case in the previous example, because the fault types are arranged within the table of FIG. 2A in an order that corresponds to a flow of signals through the various logic sections of unit 2, the first-encountered fault in the fault table will generally correspond to the first-occurring fault within the unit.

After identifying the first-occurring fault for unit 2, the first-occurring fault for unit M must likewise be identified. This is accomplished by conducting a linear search of the fault table for unit M, as shown in FIG. 2B. This search starts with the first table entry and searches for whichever one of fault types "00M-000-000" and "00M-001-000" appears first in the table. This first-located fault type will be considered the source of the fault for unit M. In the current example, fault type "00M-000-000" is located first, thereby identifying the fault detected by ED0 160 as the first-occurring fault for unit M.

In the foregoing manner, a first-occurring fault is identified for each of the units represented by the entries of the fault log. If only a single unit is involved in the processing as was the case in the previous example, the fault identified as the first-occurring fault for that unit is considered to be the source of the failure. For instance, if the fault log only included entries for unit 2, the first-occurring fault "002-001-000" is used to identify the failing logic. This may be done via a look-up table, for example. This will be discussed further below in reference to FIG. 2D.

If multiple units are involved in the fault processing, as is the case in the current example, additional processing is needed to determine which of the multiple units is associated with the source of the failure. In one embodiment, this is accomplished using the primary priority field obtained from the corresponding fault entries. In this embodiment, the higher the pre-assigned numerical value, the more likely it is that this fault is the cause of the other faults.

The use of the primary priority fields may be illustrated by returning to the current example. The first-occurring fault for unit 2 has a fault type of "002-001-000" which has a primary priority field of "1". The first-occurring fault for unit M has a fault type of "00M-000-000", which has a primary priority field of "0". Because the primary priority field for the unit 2 fault type is greater than that of the fault type for unit M, the fault detected by ED1 152 of unit 2 is considered to be the source of the error. If more than two units were involved in the fault analysis, all of the primary priority fields values are compared in this manner, and the fault type assigned the greatest primary priority field value is selected as the source of the fault.

In some cases, two or more faults may have the same value assigned to the primary priority field. In this case, the timestamps for these faults are used to determine the likely source of the problem. In particular, the first occurring of the faults is considered the likely failure source. Returning to the current example, the timestamp for fault "002-001-000" is "00005000000" whereas the timestamp for fault "00M-000-000" is "00005000010". Since the fault type "002-001-000" has a timestamp that is smaller (i.e., that precedes) the timestamp for fault type "00M-000-000", fault "002-001-000" is considered the likely source of the problem.

Because the counter/timers used to capture timestamps are of a finite size, the counter/timers will periodically "rollover". For example, a sixteen bit counter/timer will periodically be incremented from a maximum value of "FFFF" (hexadecimal) back to "0000". When analyzing multiple timestamps to determine which is associated with the earliest time, some logic must be provided to recognize this type of roll-over situation. This may involve detecting that some of the multiple timestamps have a maximum value (e.g., an "F") in the most-significant position of the timestamp, and other timestamps from related faults have a "0" in this same position. When this type of situation is detected, the smallest timestamp that does not have a "0" in the most-significant position of the timestamp represents the earliest time.

In some case, both the primary priority values and the timestamps will be the same for two or more first-occurring faults. In this scenario, the highest secondary priority value is used to identify the likely source of the problem. For instance, assuming the primary priority values and timestamps for the two first-occurring faults of the current example were the same, the secondary priority values for the two faults are considered. The secondary priority value for fault "002-001-000" is "2" whereas the secondary priority value for fault "00M-000-000" is "1". Therefore, the fault for unit 2 is considered the likely source of the fault.

In some cases, it is possible that the primary and secondary priority values as well as the timestamps are the same for two or more faults that are under analysis. In this case, the fault that is first reported to the maintenance processor 106 is considered the source of the error. For instance, if the two faults of the current example had the same primary and secondary priority values and the timestamps were also the same, the fault log of FIG. 2C would be considered. In this case, the fault entry of fault type "002-001-000" was entered before fault type "00M-000-000". Therefore, the fault from unit 2 is considered the source of the problem.

As noted above, sometimes accurate timestamps are not available for a particular logic block. This may occur, for instance, if the logic block is associated with power control or clock circuits. In this case, the timestamps cannot be used to determine a fault source in the manner described above. In one embodiment, this is addressed by assigning all fault types that have accurate timestamps a primary priority field of "0". In this case, any logic block that does not have an accurate timestamp will have a non-zero primary priority field, and thus will be considered the source of the error before a fault that does have an accurate timestamp. This is a viable solution since those logic blocks that do not have accurate timestamps are, in general, those circuits that provide fundamental logic functions (e.g., power, clocks, etc.) to the rest of the circuit blocks. Thus, if a failure is detected in one of these logic blocks, it is likely that the failure is the source of the problem, and not a "ripple effect" from some other unit.

According to the afore-mentioned embodiment, if multiple fault types having a primary priority field value of "0" are being analyzed, the timestamps may be used to accurately determine the first-occurring fault. Conversely, if multiple fault types having the same non-zero priority field value are being analyzed, indicating that accurate timestamps are not available, the analysis may proceed directly to a comparison of the secondary priority field values.

In another embodiment that does not use the above-described convention, the unavailability of an accurate timestamp may be indicated by assigning the timestamp a unique predetermined pattern such as "FFFFFFFFFFF" (hexadecimal). As may be appreciated, if this value is assigned to fault types having invalid or inaccurate timestamps, those fault types will never be selected as the first-occurring fault. Conversely, if it is desirable to always give those fault types priority, they may instead be assigned a timestamp of "00000000000" so that these fault types will always be selected as the first-occurring. This timestamp assignment can be performed automatically by the corresponding error correction logic or instead by the maintenance processor during pre-processing of the fault log entries.

Before continuing, it may be noted that the examples provided thus far are simplistic. That is, the current example involves a very limited "fault sequence" 206, where a fault sequence is the sequence of related faults that may be reported because of one or more related errors. In the current example, the fault sequence 206 of FIG. 2A represents faults that may occur in unit 2 if an address parity error occurs on a read request from logic block N 110 of unit 1 to logic block 1 of unit 2.

In practice, fault sequences may be much more complex and include many more faults than the simple fault sequence 206 of FIG. 2A. Moreover, a given fault table may include hundreds, if not thousands, of fault sequences. The ordering of multiple fault sequences within a fault table is described in reference to the additional fault sequence 208 of FIG. 2A.

Assume the additional fault sequence 208 is related to cache logic of unit 2 102. In particular, assume that logic block 3 118 of unit 2 contains a circuit that retrieves read data from a cache of unit 2. Assume further that the retrieved data is passed by logic block 3 118 to logic block 4 of unit 2 (not shown) as well as to logic block 1 114 for processing at roughly the same time. Parity bits provided for the data are checked by the ED sections of each of these logic blocks.

In accordance with the current example, fault sequence 208 of FIG. 2A includes a first fault type "002-003-0FF" for a fault detected by ED3 156. This fault sequence further includes fault types "002-001-0FF" and "002-004-0FF" detected by ED1 152 and an ED4 (not shown in FIG. 1), respectively. The fault sequence may include additional entries that are not shown for ease of reference.

The additional fault sequence 208 conveys several concepts. First, the current example involves a situation wherein signals (e.g., data) are passed to multiple logic blocks at about the same time. This may result in multiple faults being raised at approximately the same time. For instance, in this case, faults may be raised by ED1 152 and ED4 at about the same time. In this scenario, any of multiple simultaneously-occurring faults may be selected to appear first in the fault sequence. In fault sequence 208 of FIG. 2A, the fault type from ED1 (that is, "002-001-0FF") 152 appears before that detected by ED4. However this need not be the case.

It may be noted that in FIG. 2A, fault sequence 206 is listed in its entirety followed by additional fault sequences, including fault sequence 208. This arrangement may be desirable because it is easy for humans to understand. In other words, a logic designer who understands the processing flow for a particular logic function may readily translate his knowledge of the logic into an understanding of the fault type sequences that appear in the fault table. However, in a different embodiment, the table entries for one fault sequence may be intermixed with those corresponding to one or more other fault sequences. For instance, the entries for fault sequence 206 may be interspersed with the entries for fault sequence 208 so long as the relative relationship of the faults in the same fault sequence is maintained. That is, fault type "002-003-0FF" of fault sequence 208 may appear within the table before some, or all, of the entries in fault sequence 206 even though the remaining faults in sequence 208 appear after the faults of sequence 206. Fault analysis will be unaffected so long as the relative ordering of faults in the same sequence is maintained; that is, so long as fault type "002-003-0FF" appears before all of the other fault types in its same fault sequence 208.

After fault isolation has been completed, fault handling is initiated. This is discussed in reference to FIG. 2D.

FIG. 2D is a fault action table that lists the actions that are to be taken for each type of fault. Column 220 of the table lists all of the fault types for the system. Column 222 provides the maintenance action that is to be taken for a given fault. In many cases, the action will involve replacing a Field Replaceable Unit (FRU), such as a printed circuit board, a pluggable or non-pluggable device on a circuit board, and so on. In some case, some other action may be taken. For instance, if a known "workaround" exists for the problem that is considered an acceptable permanent fix, that workaround may be implemented. This workaround might involve loading a new version of microcode, disabling a little-used function, etc.

Column 224 of the table includes notification information. This indicates how information about the failure should be disseminated. For instance, a message may be automatically issued to a particular email address that includes the fault type and the recommended fault action. Instant messages may be delivered over a network to an addressed data processing device. Messages may be transmitted via automatically-generated facsimiles to particular fax numbers, electronically-generated phone calls to predetermined phone numbers, text messages issued to text messaging devices, notifications provided to pagers, messages that are placed on office or print queues, and so on. Automated call generation systems such as the Call Home™ system commercially-available from Unisys Corporation may be used for this purpose. A notification message may also be issued to an operator's console. Any form of notification or information delivery known in the art may be used for this purpose. Preferably, the notification may be completed without human intervention.

Although for ease of reference, the information shown in column 224 of FIG. 2D is very simplistic, this data may be as detailed as desired. For instance, this information will generally include message content, specific contact information, and even notification options that are time and date dependent. As an example, a first type of notification may be issued on weekend and holidays, and a different notification may be provided on weekdays.

The fault action table shown in FIG. 2D also includes a column 226 listing a temporary action that may be performed until a more permanent fix is available for the problem. For instance, if the fault is non-critical, the temporary action may indicate that maintenance processor is to place the system in a known state and restart operation. If the system includes available redundant resources, the temporary action may involve substituting those resources into the system as by automatically enabling predetermined interfaces. Some type of temporary "workaround" may be implemented, as by loading a different version of software or microcode.

In the current example, the entry for fault type "002-000-000" indicates that the maintenance action to be taken involves replacing unit 2. An automated email message is to be generated to this effect, as shown in column 224. As discussed above, this notification information may include the content of the message, as well as email address information, although for ease of reference this data is not shown in table 2D. The table further indicates in column 226 that a temporary action should be taken that involves enabling a redundant unit 2. The table may also contain all information (e.g., enables, and so on) that is needed to perform the temporary action.

Although the fault action table of FIG. 2D illustrates a single table entry for each fault type, multiple entries may be provided for a given fault type. This may be desirable if the same fault type is associated with fault situations that are closely related and therefore detected by the same ED logic section, but for some reason should be handled differently. For instance, assume that in one case, fault type "002-000-000" is associated with a situation wherein processing may continue after a redundant unit 2 is enabled. In another situation, this fault type occurred during a critical operation that requires the re-loading of a portion of memory before redundant unit 2 is enabled so that processing continues.

In the types of scenarios described above, the appropriate fault action to be selected must be determined using additional information provided in one embodiment of the fault tables. This can be appreciated by re-considering the fault table of FIG. 2B.

The embodiment of the fault table of FIG. 2B includes two additional columns 205 and 207. Column 205 includes state description data. This data specified which of the state devices within a particular portion of the system are to be retrieved by maintenance processor 106 for use in performing further fault analysis. For instance, this data may identify a "scan string", as well as the bits within the scan string, that are to be read to perform the analysis.

As is known in the art, a scan string includes logic that allows state devices within the system to be selectively configured into a circuit similar to a large serial shift register. Many such scan strings may exist within the system. During system initialization or fault analysis, maintenance processor 106 may activate one or more of these serial shift devices so that the contents of the state devices included in a selected scan string may be retrieved. State description data 205 will identify the scan string, as well as the bits of the scan string, that should be retrieved during this analysis.

If a particular fault table entry is associated with valid state description data, as may be indicated by a valid bit associated with the table entry, maintenance processor will use interface 108 to retrieve the specified bit(s) of the identified scan string(s) from the system. For instance, maintenance processor may retrieve the state captured in one or more registers of unit 2. Maintenance processing will then use decisional logic in column 207 to make a decision based on the state of the retrieved bits. For instance, decisional logic may indicate that a first fault action entry of the fault action table is to be referenced for this fault if identified bits A AND B of the retrieved state information are both set. A different fault action entry may be referenced if only bit A is set, and so on. Boolean logic descriptions of any complexity may be provided as the decisional logic in column 207 of the fault tables.

Once the decisional logic has been used to select an entry of the fault action table, the identified entry may be retrieved for use in addressing the failure as described above. Using decisional logic in this manner, as many fault actions as desired may be associated with a single fault type within the fault action table.

Figure 3:
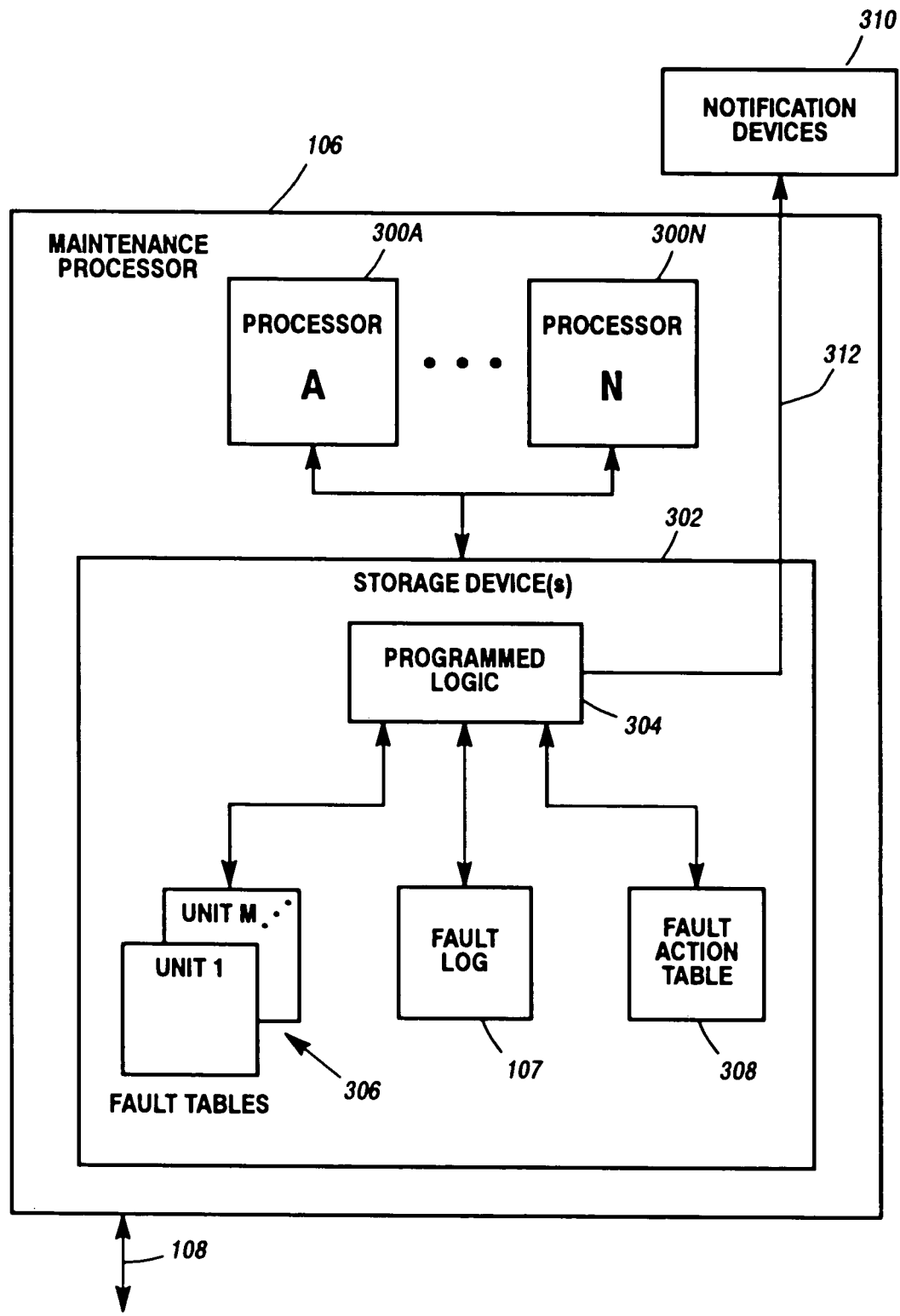
FIG. 3 is a block diagram of maintenance processor according to one embodiment of the current example.

FIG. 3 is a block diagram of maintenance processor 106 according to one embodiment of the current example. Maintenance processor 106 may be a personal computer, a workstation, or any other type of data processing system.

In the exemplary embodiment shown in FIG. 3, processors 300A-300N are coupled to one or more storage device(s) 302. The storage device(s) may be implemented as caches, one or more main memories, mass storage devices, or any other types of storage devices. These devices may be implemented using RAMs, ROMs, flash memories, disk memories, or any other type of storage technology. Some or all of processors 300A-300N and some or all of the storage device(s) 302 may be implemented on a single silicon device, such as an Application Specification Integrated Circuit (ASIC).

Storage device(s) 302 store programmed logic 304 that may include software and/or microcode executable by processors 300A-300N to implement the process described above. Some or all of programmed logic may be implemented in hardware, such as specialized circuitry included within, or coupled to, one or more of processors 300A-300N.

During system operation, maintenance processor 106 receives fault reports on interface 108. Using information contained in these fault reports, including fault types and in some cases timestamps, entries are created within fault log 107. Fault log 107 may be a file or some other type of structure maintained on the one or more storage devices.

After entries are created within the fault log 107, programmed logic 304 automatically performs fault analysis using fault tables 306 in the above-described manner. After a fault type has been identified for the fault that likely represents a source of a failure, that fault type is used to reference the fault action table 308. This table may provide short-term and/or long-term actions to be taken in response to the fault. This table may further provide information regarding the notifications to be issued in response to the fault. Any other information may be included in the fault action table 308.

Various notification devices 310 may be coupled to maintenance processor 106 via interfaces 312 for use in providing information regarding fault occurrences. Interfaces 312 may include any type of wired or wireless communication networks, such as the Internet, intranets, phone lines, wireless communication channels, blue tooth links, and so on. Notification devices may include traditional telephones, mobile phones, personal data assistants (PDAs), pagers, facsimile machines, printers, any devices suitable for receiving email or text messages, and any other devices that are capable of communicating the fault information and actions that are to be taken in response to detected faults.

The configuration illustrated in FIG. 3 is exemplary only, and many other embodiments are possible. For instance, the information contained in multiple fault tables 306 may instead be incorporated into a single table having respectively dedicated table entries for each unit. In this case, indexing may be used to locate the table entries of interest. Similarly, the fault log 107 and fault action table 308 may be implemented as any type of one or more data structures. Some of the notification devices 310 may be incorporated into maintenance processor 106. Thus, it is understood FIG. 3 is illustrative in nature only, and not limiting.

Figure 4A:
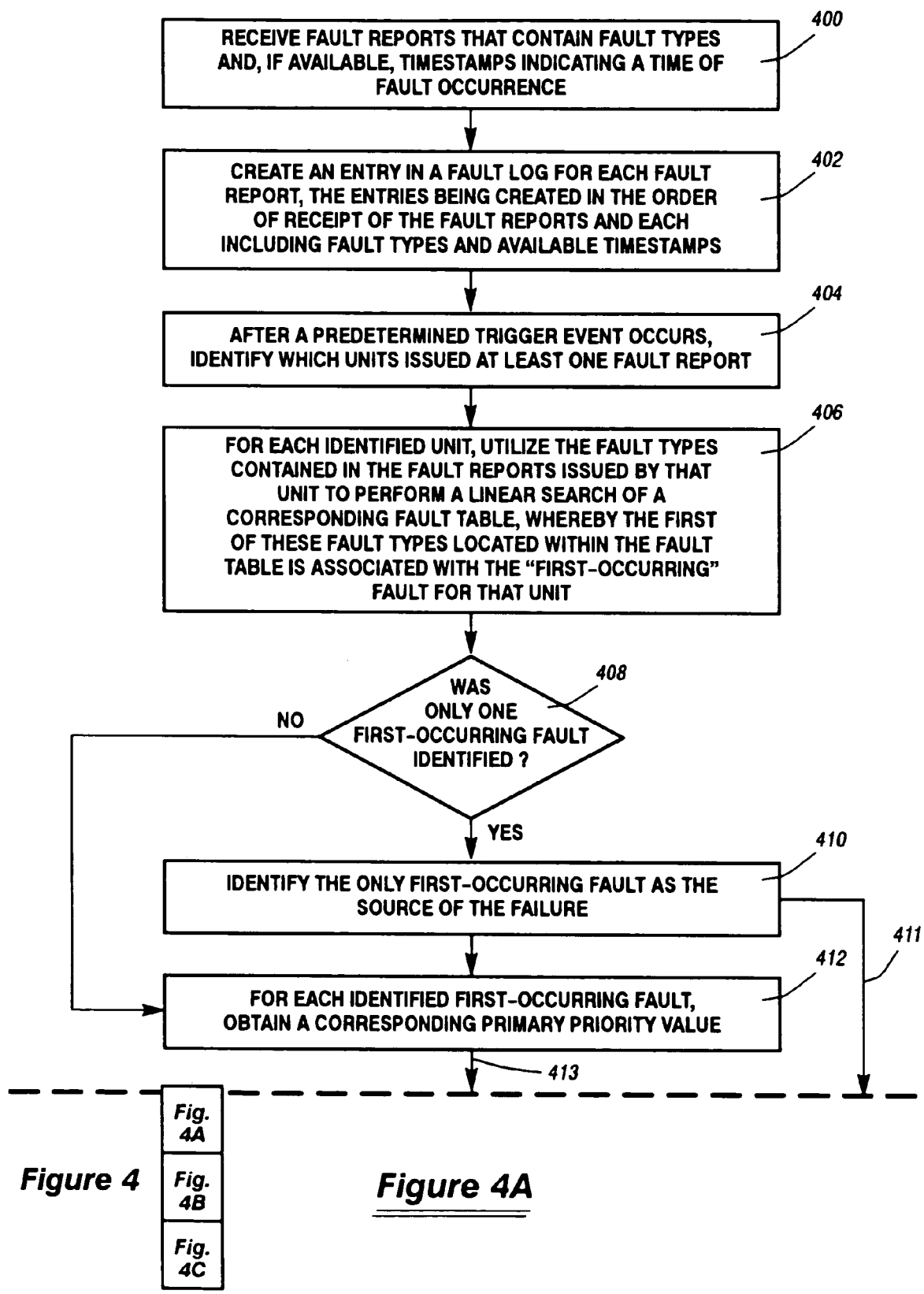
FIGS. 4A-4C, when arranged as shown in FIG. 4, are a flow diagram illustrating one method according to the current invention.
Figure 4B:
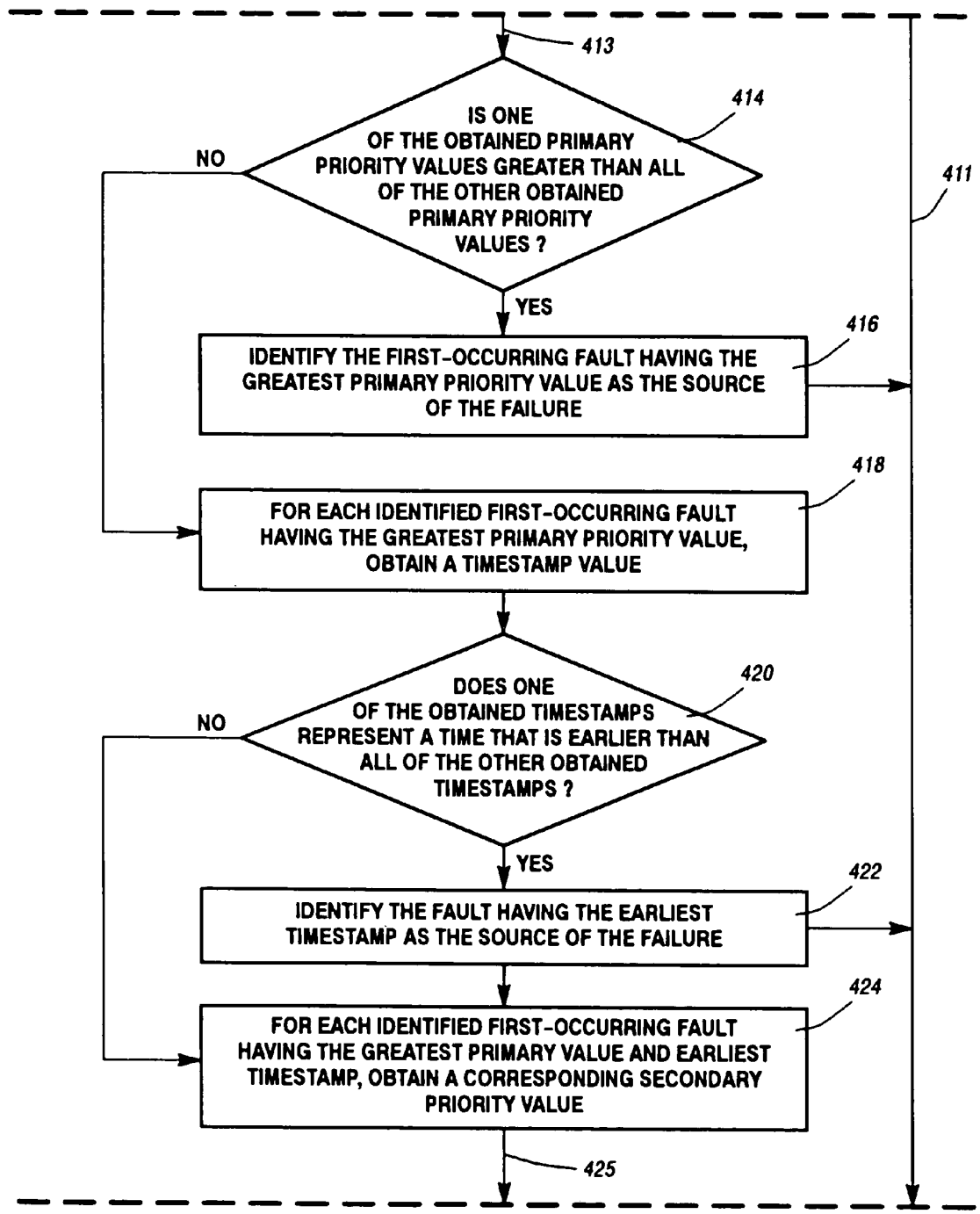
Figure 4C:
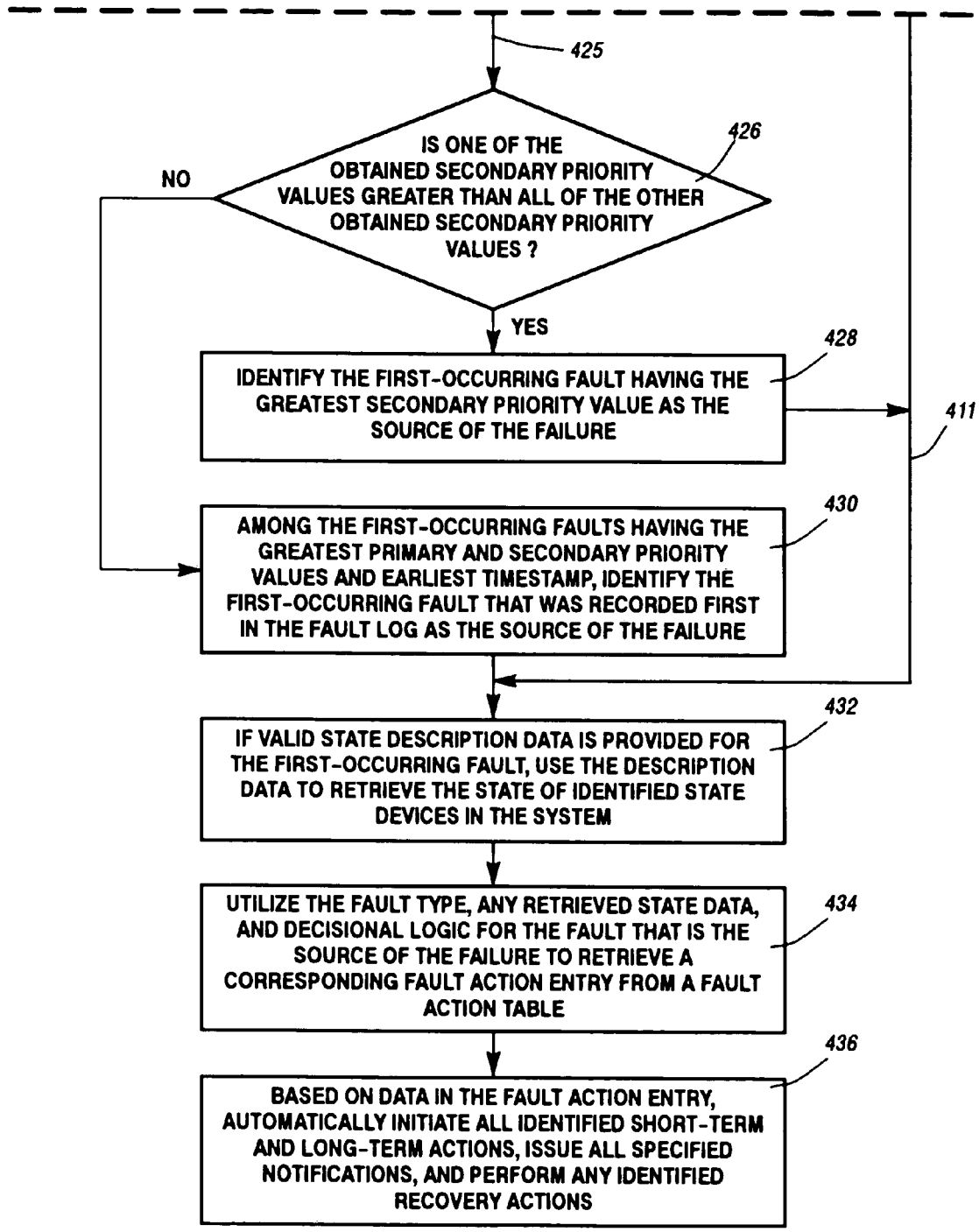

FIGS. 4A-4C, when arranged as shown in FIG. 4, are a flow diagram illustrating one method according to the current invention. The maintenance processor receives fault reports that contain fault types and, if available, timestamps that indicate a time of a fault occurrence (400). In response, the maintenance processor creates an entry in a fault log for each received fault report (402). The entries are created in the order of receipt of the fault reports, with each entry including the fault type and any available timestamp from the corresponding fault report.

After some trigger event occurs, the maintenance processor will begin analysis to determine which units in the system issued at least one fault report that is recorded within the fault log (404). The trigger event may occur when some predetermined period of time elapses after receipt of the first fault report without receiving another fault report, thus indicating that all fault reports for the particular failure have likely been received by the maintenance processor. In another embodiment, processing may be initiated a predetermined period of time after receipt of the first fault report.

After the maintenance processor determined which units in the system issued at least one fault report, the maintenance processor will perform fault processing for each of the identified units. In particular, for each identified unit, the fault types generated by that unit will be used to perform a linear search of a corresponding fault table, and the first of the fault types located within this table is associated with the likely "first-occurring" fault for that unit (406).

If only one first-occurring fault was identified (that is, only one unit created the fault reports), then the first-occurring fault is identified as the source of the failure (408, 410). In this case, processing continues to step 432 of FIG. 4C, as indicated by arrow 411. On the other hand, if multiple first-occurring faults were identified (that is, multiple units created the fault reports), then processing continues to step 412, where a primary priority value is obtained for each of the identified first-occurring faults. In one embodiment, this primary priority value is obtained from a corresponding entry in the fault table, although it is possible this value may be obtained from some other data structure.

Processing then continues to FIG. 4B as indicated by arrow 413. There, it is determined whether one of the obtained primary priority values is greater than all of the other obtained primary priority values (414). If not, a "tie" exists between two or more of the obtained primary priority values. If a "tie" does not exist such that there is one value that is greater than all of the others, the first-occurring fault having that greatest primary priority value is identified as the source of the failure (416). Processing then continues to step 432 of FIG. 4C, as indicated by arrow 411. On the other hand, if two or more primary priority values are "tied" as the greatest primary priority values, processing proceeds to step 418 where timestamp data is obtained from the fault log for each first-occurring fault that is in this "tie".

As discussed above, not all fault types will be associated with accurate timestamp data. In one embodiment, those fault types that are not associated with valid accurate timestamps will be assigned a predetermined timestamp value (e.g., "FFFFFFFFFF") that will be included in the fault log entries. This value may be assigned by the error detection logic that generates the original fault report or by the maintenance processor 106 during creation of the fault log entries. In this manner, timestamp values will be available even for those fault types for which valid timestamps cannot be obtained.

After the timestamp values have been obtained from the fault log, it is determined whether one of the timestamps represents a time that is earlier than the times represented by the other obtained timestamps (420). If so, the fault having the earliest timestamp is identified as the source of the failure 422, and processing proceeds to step 432 of FIG. 4C, as indicated by arrow 411. Otherwise, if two timestamps are "tied" for the earliest timestamp, execution continues to step 424. There, a secondary priority value is obtained for each of the identified first-occurring faults that are still included in the "tie". (That is, all first-occurring faults that are in a "tie" for having the greatest primary priority value and the earliest timestamp.)

Processing next continues to step 426 of FIG. 4C, as indicated by arrow 425. At step 426, it is determined whether one of the obtained secondary priority values is greater than all of the other obtained secondary priority values. If so, the corresponding first-occurring fault is identified as the source of the failure (428), and processing continues to step 432. Otherwise, it is determined which of the faults that remains in the "tie" was reported first to the maintenance processor, and was therefore entered first into the fault log (430). This fault is identified as the source of the failure.

After the fault that is the source of the failure has been identified, in one embodiment, if any valid state description data is available for the fault, that data is used to retrieve the state of identified devices within the system (432). For the fault that is the source of the failure, the fault type and any retrieved state information, and any available decisional logic may be used to retrieve an entry from a fault action table (434). This fault action entry will include data that describes at least one of a short-term action, a long-term action, a notification action, and a recovery action, to be taken in response to the fault. The actions specified in the fault action entry will be initiated (436). In one embodiment, at least some of these actions will be initiated without human intervention.

Figure 5:
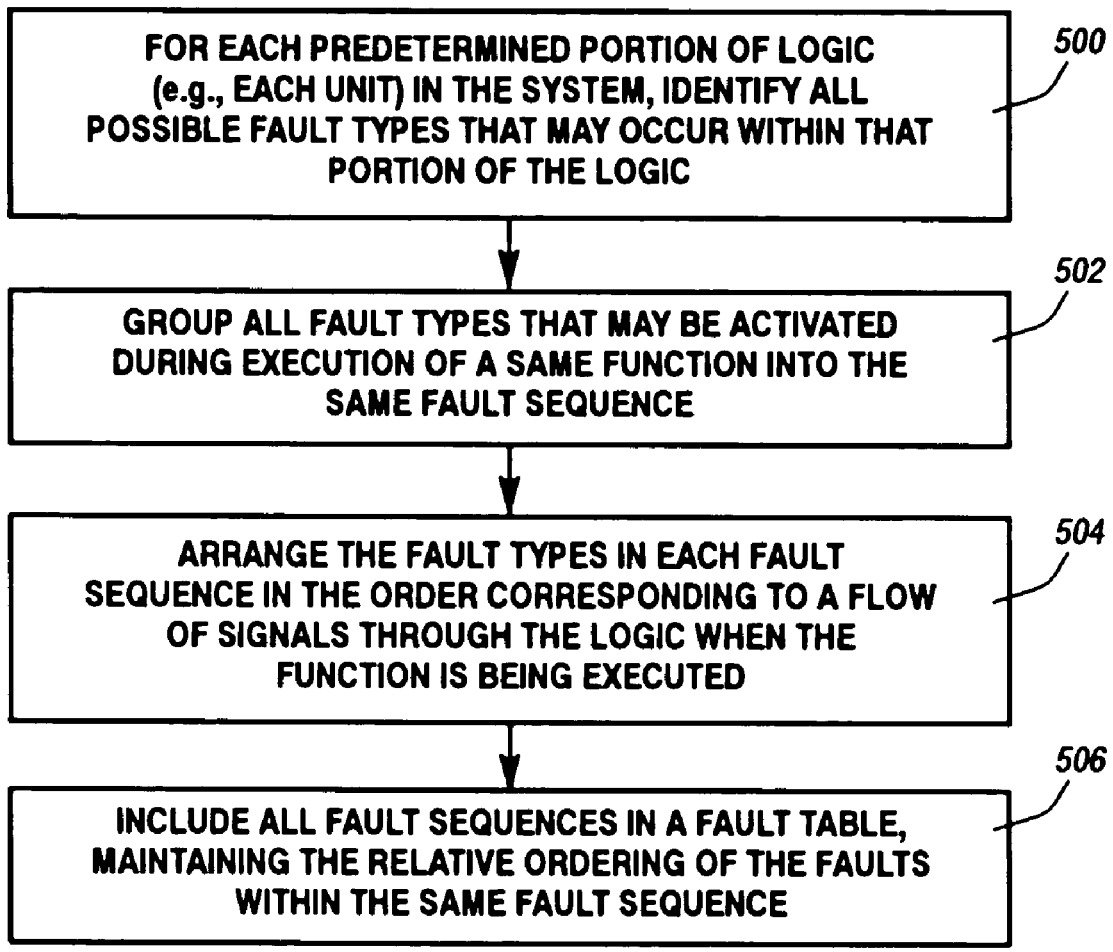
FIG. 5 is a flow diagram illustrating definition of a fault table according to one embodiment of the current invention.

FIG. 5 is a flow diagram illustrating definition of a fault table according to one embodiment of the current invention. Generally, such tables will be generated with the aid of logic designers, system analysts, or some other type of specialists that understand the flow of signals through the system. However, those skilled in the art will appreciate that automated CAD tools are available to perform at least some of the definition tasks.

First, for each predetermined portion of logic within the system, all possible fault types that may be raised for that portion of logic are identified (500). In the current embodiment, such predetermined logic portions are referred to as units.

Next, all related fault types that may be activated during execution of a same function within the same portion of logic are grouped into a same fault sequence (502). For instance, all faults that may be raised during the processing of a read request by a cache memory may be identified for inclusion in the same fault sequence. All of the faults in the same fault sequence are then ordered in a manner that corresponds to the flow of processing through the logic during execution of the function (504). In other words, the faults are arranged in the time-order those faults would be raised by the logic during execution of the function. After all fault sequences have been thus defined, they are included in a fault table, with the relative ordering of the faults in the same sequence being maintained (506).

It will be understood that the embodiments shown in the logic diagrams, tables and flow diagrams are exemplary only, and many other embodiments are possible within the scope of the current invention. For instance, the tables may contain more or fewer fields than those shown. If desired, many of the tables may be consolidated. In some cases, the ordering of the steps in the flow diagrams may be changed without impacting the functionality of the methods. Thus, the description is to be considered illustrative in nature, with the scope of the invention being defined by the Claims to follow.

What is claimed is:

1. A computer-implemented method of isolating failures in a system, comprising:
   a) receiving reports of multiple faults occurring within a unit, and storing the faults in a fault table for the unit, the fault table being stored on a storage device;
   b) utilizing a processor to perform a linear search of the fault table for the unit to identify one of the multiple faults that first appears in the fault table;
   c) determining that the identified fault is a first-occurring fault that is a source of a failure within the unit;
   repeating steps a through c for multiple units in the system to thereby identify a first-occurring fault for each of the multiple units;
   obtaining a primary priority value for each of the first-occurring faults;
   identifying the first-occurring fault with a greatest obtained primary priority value as the source of the failure within the system;
   if the greatest primary priority value is obtained for multiple ones of the first-occurring faults, obtaining a timestamp for each of the multiple ones of the first-occurring faults; and,
   if only one first-occurring fault has an earliest obtained timestamp, identifying the one first-occurring fault as the source of the failure within the system.

2. The method of claim 1 further comprising:
   if the earliest timestamp is obtained for multiple ones of the first-occurring faults, obtaining a secondary priority value for each of multiple first-occurring faults having the same greatest primary priority value and having a same earliest timestamp; and
   identifying the one of the first-occurring faults with a greatest obtained secondary priority value as the source of the failure within the system.

3. The method of claim 2, further comprising:
   if a same greatest secondary priority value is obtained for multiple ones of the first-occurring faults, identifying as the source of the failure within the system a first-reported one of the first-occurring faults having the same greatest primary priority value, the same earliest timestamp, and the same greatest secondary priority value.

4. The method of claim 1, further comprising:
   determining which of the identified first-occurring faults is the source of the failure for the stem based on at least one of:
   assigned primary priority values,
   assigned secondary priority values,
   timestamp values, and
   an order in which the first-occurring faults were received; and
   determining a fault action to take based on which of the identified first-occurring faults is determined to be the source of the failure.

5. The method of claim 4, further comprising:
   obtaining a state of at least a portion of the system; and
   determining the fault action to take based, in part, on the obtained state.

6. The method of claim 4, wherein the fault action comprises at least one of a short-term action, a long-term action, a notification action, and a recovery action.

7. The method of claim 6, wherein the fault action is initiated without human intervention.

8. The method of claim 7, and further including defining a fault table to include one or more fault sequences, each fault sequence representing an order in which faults are activated within logic associated with the fault sequence.

9. A system to isolate failures within a monitored system, comprising:
   a storage device to store one or more fault tables; and
   a processor to receive faults reports that each identify a fault occurring within the monitored system, the processor to determine which of the faults are associated with a same unit of the monitored system, to perform a linear search of one of the fault tables that is associated with the unit to determine which of the associated faults is encountered first within the one of the fault tables, the first-encountered fault being a source of a failure within the unit of the monitored system, to repeat the fault source identification being repeated for multiple units in the monitored system, to obtain a primary priority value for each of the first-encountered faults; to identify the first-encountered fault with a greatest obtained primary value as the source of the failure within the system, and, if multiple ones of the first-encountered faults have the same greatest primary priority value, identifying the one of the multiple first-encountered failures having the earliest timestamp as the source of the failure within the system.

10. The system of claim 9, wherein the monitored system includes multiple units, and further including programmed logic executing on the processor to cause the processor to identify the first-encountered fault for each of the multiple units that provided a fault report to the processor.

11. The system of claim 10, wherein the programmed logic includes means for selecting from all of the first-encountered faults for all units that provided fault reports to the processor to identify a source of a failure for the system, selection being based on at least one of:
   primary priority values assigned to the first-encountered faults;
   secondary priority values assigned to the first-encountered faults;
   timestamp values associated with the first-encountered faults; and
   an order in which the fault reports identifying the first-encountered faults were received by the processor.

12. The system of claim 11, wherein the one or more fault tables store state description data, and further including an interface coupling the processor to the system being monitored to allow at least a portion of the state of the monitored system to be retrieved for use in determining a fault action to be taken in response to the failure.

13. The system of claim 9, and further including one or more notification devices to issue a notification describing the failure.

14. A fault isolation system for isolating a failure in a monitored system, comprising:
    means for logging faults detected within the monitored system, the detected faults being logged in a fault table of a database, and the said database stored on a storage device; and
    means for grouping the faults based on which units of the monitored system detected the fault, and for thereafter searching the fault table to determine which fault in a group of faults appears first in the table, the first-appearing fault being identified as a source of the fault for a unit associated with the system;
    means for repeating the fault source identification for multiple units in the system, thereby identifying a first-appearing fault for each of the multiple units the means further obtaining a primary priority value for each of the identified first-appearing faults, means being performed by a processor; and,
    means for identifying the first-appearing fault with the greatest obtained primary priority value as the source of the failure within the system, wherein, if the greatest primary priority value is obtained for multiple ones of the first-appearing faults, the means further obtains a timestamp for each of the multiple ones of the first-appearing faults and identifies the first-appearing fault with the earliest obtained timestamp as the source of the failure within the system.

15. The system of claim 14, and further including means for defining the fault table to include multiple fault sequences, each fault sequence representing a flow of signals through apportion of logic included in the unit that is associated with the fault table.

16. The system of claim 14, and further including means for determining a respective first-appearing fault for each unit in the monitored system for which a fault was logged, and for determining which of the first-appearing faults is a source of the failure within the monitored system based on at least one of:
    a primary priority value assigned to each of the faults;
    a secondary priority value assigned to each of the faults;
    a timestamp value assigned to each of the faults; and
    an order in which the faults were logged.

17. The system of claim 14, and further including means for retrieving a state of one or more devices within the monitored system and for determining an action to take in response to the source of the failure, the determination being based at least in part on the retrieved state.

* * * * *